Patented May 29, 1934

1,960,445

UNITED STATES PATENT OFFICE 1,960,445

METHOD OF PRODUCING RUBBER ARTICLES

John McGavack, Leonia, N. J., assignor to The Naugatuck Chemical Company, Naugatuck, Conn., a corporation of Connecticut No Drawing. Application March 3, 1932, Serial No. 596,569

18 Claims. (Cl. 18—58)

This invention relates to methods of producing rubber articles, and more particularly to methods of producing rubber articles from aqueous dispersions of rubber.

The coagulation of aqueous dispersions of rubber by means of various coagulants, such as acetic acid and alcohol, in the preparation of rubber articles, is well known. Rubber articles have been produced by dipping a porous or non-porous form of the shape desired into an aqueous dispersion of rubber and then into a coagulant, such as acetic acid or alcohol, and the process repeated until the desired thickness of rubber article has been produced. In such cases the coagulated rubber deposit on the form is dried and, if desired, stripped from the form, or the form on which the rubber has been deposited may be itself a part of the finished article producing a composite material. Rubber articles have also been produced by treating a porous or non-porous form first with a coagulant, such as acetic acid or the like, and then dipping the treated form into an aqueous dispersion of rubber, retaining the form in the dispersion until the desired thickness of rubber has been coagulated on the surface, removing the form and then drying to form the finished article. Various modifications of this process are known wherein a hollow porous form is used and the coagulant retained in the form itself and allowed to seep out through the interior of the form to the surface thereof, thereby coagulating rubber on the surface of the form from the aqueous dispersion in which the form may be submerged. It is also known to prepare a form from material such as gypsum, which partly goes into solution and acts as a coagulant, dip the form into an aqueous dispersion of rubber, to coagulate a rubber film on the surface thereof, remove and dry in the usual manner. Porous and non-porous forms have been coated with an absorbent material, such as gelatine and the like into which has been incorporated a coagulating material, and the treated form dipped into an aqueous dispersion of rubber until a film of the desired thickness has been produced on the surface of the form, and then the form removed and the deposit dried.

It is also well known to produce elastic thread from aqueous dispersion of rubber by coagulating a dispersion in the form of a continuous length by means of acetic acid, alcohol and other common coagulating agents. The patent to Hopkinson and Gibbons No. 1,545,257 describes one method of forming rubber into a continuous thread by means of extruding the dispersion through an orifice of the desired shape into a coagulant. In the copending application of W. A. Gibbons, Serial No. 595,235, filed Feb. 25, 1932, there is disclosed and claimed the method of preparing continuous lengths of elastic thread by passing a stream of coagulant into a body of aqueous dispersion of rubber and removing therefrom a continuous length of rubber coagulum in the form of a thread.

The present invention relates to the production of rubber articles by such above described methods and other methods wherein the rubber solids of an aqueous dispersion of rubber are coagulated in the shape desired to form a rubber article.

In carrying out my invention, I use as a coagulant for the coagulation of the rubber solids of aqueous dispersions of rubber materials such as the lower aliphatic acid anhydrides, which may be symmetrical or mixed anhydrides, and the lower aliphatic acid halides. I may employ the anhydrides and chlorides of both monobasic and polybasic acids. The use of such coagulants provides a two-fold advantage; first, the best known type of coagulating material is formed in situ only at the particular place where it is needed, namely, in the zone where the dispersed rubber is to be coagulated; and secondly, the use of such coagulating materials allows the coagulated rubber to be dried more easily and in less time.

In order to understand wherein the coagulants disclosed permit the formation of the best known type of coagulating materials in situ at the particular place where they are needed, it is only necessary to write the reactions that occur when such substances come in contact with water. The following two reactions are merely examples of type reactions and show the reactions of acetic anhydride and acetyl chloride respectively with water:

1. $(CH_3CO)_2O + H_2O = 2CH_3COOH$
2. $CH_3COCl + H_2O = CH_3COOH + HCl$

It will be seen thus that well known strong coagulating agents, namely, acetic acid alone in the first example above, and acetic acid and hydrochloric acid in the second example above, are formed in situ as soon as the aqueous dispersion of rubber comes in contact with the coagulating materials, the coagulating materials, of course, reacting as above described with the aqueous phase of the rubber dispersion.

A second distinct advantage is that the use of such coagulants allows the coagulated rubber to be dried more rapidly than when the free acids themselves are used directly. This is obvious from observations of the above equations, which show that part of the water is removed by chemical action, being converted into acidic substances from which the water cannot be regenerated under the conditions of the process. In this way, if sufficient time is allowed for the reaction, the entire deposit may be freed of water, and the subsequent drying time is thus greatly decreased. This process of chemical removal of water is particularly effective in cases where the surface of the coagulated body of rubber is large compared with its volume, such a case being exemplified by a thread formed directly from latex.

Various lower aliphatic acid anhydrides and halides, including acetic anhydride, propionic anhydride, butyric anhydride, iso-butyric anhydride, formyl acetic anhydride, chloracetic anhydride, acrylic anhydride, crotonic anhydride, maleic anhydride, and acetyl, propionyl, butyryl, acrylyl, crotonyl, chloracetyl, oxalyl, and malonyl chlorides and bromides, and like materials may be used in the various well known processes, as above described, where the rubber solids of an aqueous dispersion are coagulated to form an article of the shape desired. These substances may be used alone or may be mixed with other materials, such as adhesive materials when used, for example, for coating a form prior to dipping in an aqueous dispersion of rubber. As examples of such materials with which may be mixed the coagulants of this invention, may be mentioned rubber cement, organic solutions of gelatine and glue, cellulose nitrate solutions in alcohol and other organic solvents. By this method it is possible to surface a form which is subsequently to be dipped into an aqueous dispersion of rubber with sufficient coagulating agent to cause a deposit of rubber of a desired thickness.

The following examples are merely included as illustrations and are not intended to be construed in any way as limitations of the invention.

A test tube was dipped into a once creamed latex for a few seconds, then into acetic anhydride for 10 seconds, then again into the latex for 4 minutes, and then into the acetic anhydride for 5 seconds, and was then removed and dried. A film of rubber of .062 inch gauge was obtained.

In another example, a test tube was dipped into a once creamed latex for a few seconds, then into acetic anhydride for 10 seconds, then into the latex again for four minutes, then into acetic anhydride for 5 seconds, then into the latex for 3 minutes more, and then into the acetic anhydride for 5 seconds, and was then removed and dried. The gauge of film in this case was .200 inch.

In a third example a test tube was dipped into a mixture of 10 parts of acetic anhydride and 10 parts of rubber cement for a few seconds, and was then immersed into a creamed latex for 4 minutes. With this single dip a film of rubber of .063 inch gauge was obtained.

As shown in the above examples, the thickness of the deposit depends upon the length of time the form is immersed in the aqueous dispersion of rubber, the amount of coagulating agent adhering to the form, and the relative concentration of the aqueous dispersion of rubber used. Similar results were obtained with acetyl chloride.

Rubber articles may be prepared by the process of the present invention which are wholly or in part of rubber. For example, the form on which the aqueous dispersion of rubber may be coagulated according to the present invention may itself be made of a porous or non-porous material, and after the rubber has been deposited on the form in the shape desired, it may be stripped from the form, after drying prior or subsequent to vulcanization. Such method is practicable in the manufacture of rubber gloves, balloons and the like. The form, however, may be of metal or other material and the rubber deposited to form thereon a permanent coating, the whole being a composite finished article. The term "rubber article" as used in the specification and claims is intended to cover all such articles partly or wholly of rubber material. In the examples above described, the aqueous dispersion of rubber used was a once creamed latex but it is evident that other latices, such as natural or artificial latex, purified or otherwise, or concentrated, if desired, with or without vulcanizing ingredients, or prevulcanized may be used. The term "aqueous dispersion of rubber" as used in the specification and claims is intended to include natural latex and artificial dispersions of rubber, commonly termed artificial latex, and aqueous dispersions of synthetic materials resembling rubber.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of producing a rubber article from an aqueous dispersion of rubber comprising the step of forming an aqueous dispersion of rubber in the shape desired and coagulating the rubber solids from said dispersion by means of material from the group consisting of anhydrides and halides of the lower aliphatic acids.

2. The method of producing a rubber article from an aqueous dispersion of rubber comprising the step of forming an aqueous dispersion of rubber in the shape desired and coagulating the rubber solids from said dispersion by means of acetic anhydride.

3. The method of producing a rubber article from an aqueous dispersion of rubber comprising the step of forming an aqueous dispersion of rubber in the shape desired and coagulating the rubber solids from said dispersion by means of acetyl halide.

4. The method of producing a rubber article from an aqueous dispersion of rubber comprising the steps of treating a form with an aqueous dispersion of rubber and material from the group consisting of anhydrides and halides of the lower aliphatic acids.

5. The method of producing a rubber article from an aqueous dispersion of rubber comprising the steps of treating a form with an aqueous dispersion of rubber and acetic anhydride.

6. The method of producing a rubber article from an aqueous dispersion of rubber comprising the steps of treating a form with an aqueous dispersion of rubber and acetyl halide.

7. The method of producing a rubber article from an aqueous dispersion of rubber comprising treating a form with material from the group consisting of anhydrides and halides of the lower aliphatic acids and then treating said form with an aqueous dispersion of rubber.

8. The method of producing a rubber article from an aqueous dispersion of rubber comprising treating a form with acetic anhydride, and then treating said form with an aqueous dispersion of rubber.

9. The method of producing a rubber article from an aqueous dispersion of rubber comprising treating a form with acetyl halide and then treating said form with an aqueous dispersion of rubber.

10. The method of producing elastic thread comprising the step of coagulating the rubber solids of an aqueous dispersion in the form of a continuous length by means of material from the group consisting of anhydrides and halides of the lower aliphatic acids.

11. The method of producing elastic thread comprising the step of coagulating the rubber solids of an aqueous dispersion in the form of a continuous length by means of acetic anhydride.

12. The method of producing elastic thread comprising the step of coagulating the rubber solids of an aqueous dispersion in the form of a continuous length by means of acetyl halide.

13. The method of producing elastic thread comprising the steps of streaming an aqueous dispersion of rubber into a coagulant from the group consisting of anhydrides and halides of the lower aliphatic acids, and removing the coagulum in the form of a continuous length from said coagulant.

14. The method of producing elastic thread comprising the steps of streaming an aqueous dispersion of rubber into acetic anhydride, and removing the coagulum in the form of a continuous length from said acetic anhydride.

15. The method of producing elastic thread comprising the steps of streaming an aqueous dispersion of rubber into acetyl halide, and removing the coagulum in the form of a continuous length from said acetyl halide.

16. The method of producing a rubber article from an aqueous dispersion of rubber comprising treating a form of the shape desired with a non-aqueous adhesive substance containing material from the group consisting of anhydrides and halides of the lower aliphatic acids, and then treating said form with an aqueous dispersion of rubber.

17. The method of producing a rubber article from an aqueous dispersion of rubber comprising dipping a form into a non-aqueous adhesive substance containing material from the group consisting of anhydrides and halides of the lower aliphatic acids, removing said form, dipping the thus treated form into an aqueous dispersion of rubber and allowing it to remain until a film of rubber of the desired thickness has been deposited on the form, removing the form and drying the film.

18. The method of providing a rubber article from latex comprising dipping a form into material from the group consisting of the anhydride and halides of acetic acid, removing said form, dipping the thus treated form into latex and allowing it to remain until a film of rubber of the desired thickness has been deposited on the form, removing the form, and drying the film.

JOHN McGAVACK.